United States Patent [11] 3,582,182

[72] Inventor Robert L. Martin
 14313 N.E. Fremont, Portland, Oreg. 97230
[21] Appl. No. 824,432
[22] Filed May 14, 1969
[45] Patented June 1, 1971

[54] DISPOSABLE AND COLLAPSIBLE VIEWER
 2 Claims, 10 Drawing Figs.
[52] U.S. Cl. .................................................... 350/140
[51] Int. Cl. ..................................................... G02g 27/22
[50] Field of Search ......................................... 350/140

[56] References Cited
 UNITED STATES PATENTS
 2,724,991 11/1955 Levine ........................... 350/140
 2,868,071 1/1959 Kiehl ............................. 350/140
 2,872,844 2/1959 Van Tuyl ....................... 350/140
 2,919,509 1/1960 Strandberg .................... 350/140
 2,934,999 5/1960 Baumel ......................... 350/140

OTHER REFERENCES
" Fort Pierce Industries" , Stere-o-card Sample, Feb. 17, 1958

Primary Examiner—David Schonberg
Assistant Examiner—Paul A. Sacher
Attorney—Eugene M. Eckelman ABSTRACT: A viewer is constructed of an inexpensive material such as paper and is designed to be disposed of after minimum usage. The viewer is constructed of a blank of paper foldable to form a base or handle portion, a viewing portion, and a face portion on which advertising material may be carried. The viewer has a magnifying lens and has means for movably receiving slides viewable through the lens when the viewer is unfolded. By means of a novel arrangement of panels and fold lines associated therewith the viewer can be folded into a flat package for shipment or storage.

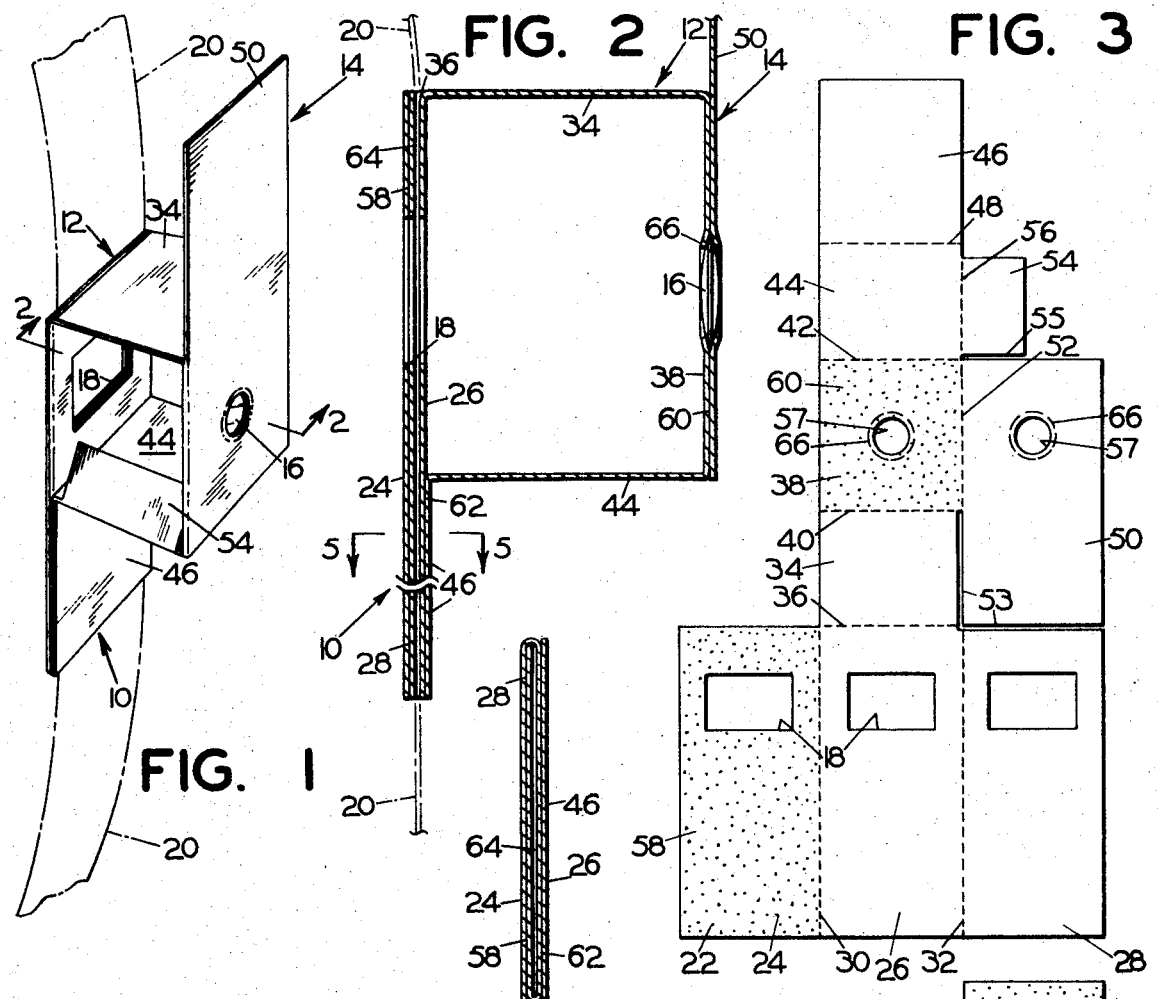

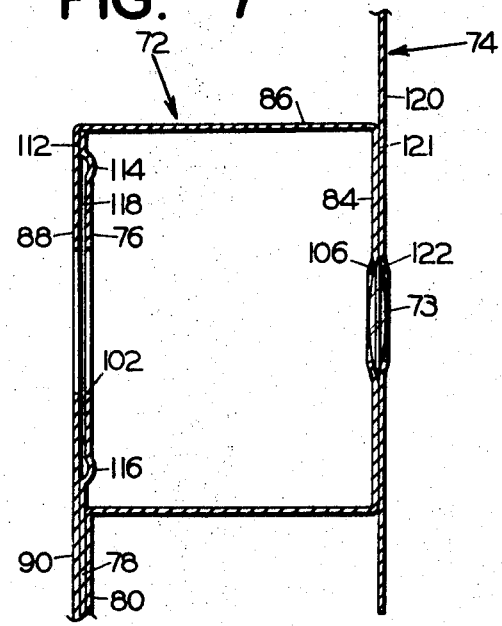
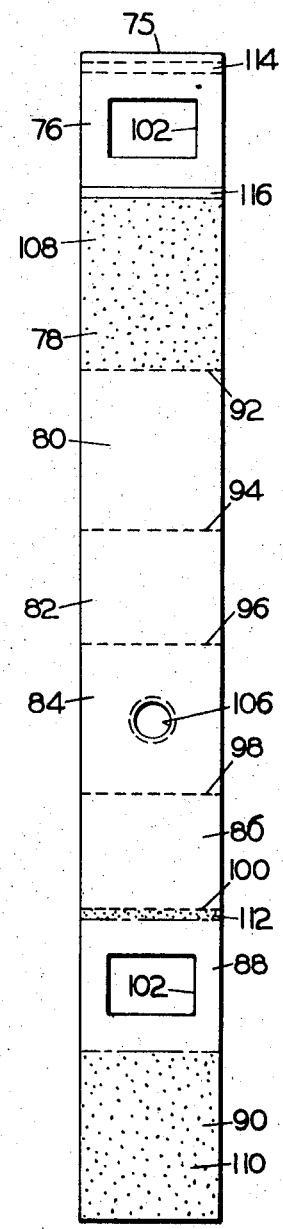
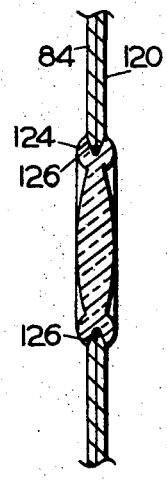
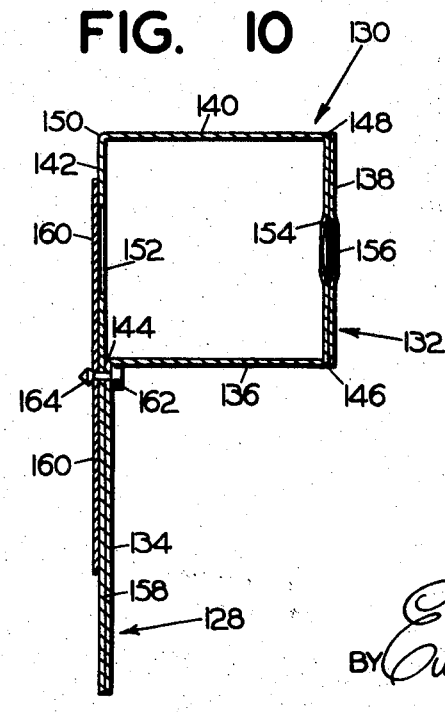

DISPOSABLE AND COLLAPSIBLE VIEWER

This invention relates to new and useful improvements in viewers arranged to receive transparencies or the like for viewing in enlargement and being of a type which can be disposed of after minimum usage.

A primary objective of the present invention is to provide a novel structure of viewer which is inexpensive to manufacture.

Another object is to provide a viewer of the type described which has novel means of construction providing a base portion, a viewing portion, and a face portion adapted to carry an advertising message.

Another object is to provide a viewer arranged to be constructed from a blank of paper having a novel arrangement of folds, bend lines, glue lines and cutout portions to accomplish efficient viewing of transparencies or the like when folded into shape and to be collapsed to a flat package for shipment or storage.

The invention will be better understood and additional objects and advantages will become apparent from the following description taken in connection with the accompanying drawings which illustrate preferred forms of the device.

In the drawings:

FIG. 1 is a perspective view of a first form of viewer embodying features of the present invention;

FIG. 2 is a fragmentary, vertical, enlarged sectional view taken on the line 2-2 of FIG. 1;

FIG. 3 is a plan view of a blank from which the embodiment of FIG. 1 is constructed;

FIG. 4 is a fragmentary plan view of a portion of the blank of FIG. 3, taken from the opposite side;

FIG. 5 is a horizontal sectional view taken on the line 5-5 of FIG. 2;

FIG. 6 is a perspective view of a second embodiment of the invention;

FIG. 7 is a vertical, enlarged sectional view taken on the line 7-7 of FIG. 6;

FIG. 8 is a plan view of a blank from which the embodiment of FIG. 6 is constructed;

FIG. 9 is a sectional view showing a modified form of structure relating to lens mounting means; and FIG. 10 is a vertical sectional view of a third embodiment of the invention.

Referring in particular to the drawings, and first to FIG. 1 which shows a first embodiment of the viewer of the invention, the numeral 10 designates a base portion of the viewer, the numeral 12 designates a viewing or box portion, and the numeral 14 designates an advertising or face portion. The viewing portion 12 includes a magnifying glass 16 and a viewing window 18. The present viewer may be constructed of paper or other inexpensive material and in its unfolded condition, as shown in FIG. 1, is capable of viewing through magnifying lens 16 transparencies 20 or the like placed in the window 18. The viewer may be shipped or stored in flat condition which comprises folding the viewing portion 12 toward the handle portion in either up or down movement such that the face portion 14 is adjacent to the handle portion.

The viewer embodiment of FIG. 1 is constructed from a blank of paper 22 shown in plan in FIG. 3, and for purposes of explanation herein, forward is considered to be toward the observer and rearward is considered to be away from the observer. Such blank comprises three lower panels 24, 26 and 28. Panels 24 and 26 are connected by a fold line 30 and panels 26 and 28 are connected by a fold line 32. The blank 22 includes a panel 34 extending upwardly from panel 26 and connected thereto by a fold line 36, and extending upwardly from panel 34 is a panel 38 connected to panel 34 by a fold line 40. Extending upwardly from panel 38 and connected thereto by a fold line 42 is a panel 44 in turn connected to an upper panel 46 by a fold line 48. A panel 50 is provided at one side of panels 34 and 38 and above panel 28, such panel 50 being connected to panel 38 by a fold line 52 but being disconnected from panels 34 and 28 by a cut line 53. Finally, a panel 54 is provided at one side of panel 42 and connected thereto by a fold line 56, this panel being of small dimension with relation to the other panels and being separated from panel 50 by a cut line 55.

Panels 38 and 50 have apertures 57 for exposing the lens 16, as will be more apparent hereinafter. The panels 24 and 38 have a glue surface designated by the numerals 58 and 60, respectively, on one side of the blank which may comprise a pressure sensitive adhesive or an adhesive which exists in a dry layer and merely needs to be wetted. The panel 46 has a glue surface 62 on the opposite side of the blank from the glue surfaces 58 and 60.

The blank 22, as shown in FIGS. 3 and 4 can be folded to form the viewer structure shown in FIGS. 1, 2 and 5 by folding the blank as follows: With reference to FIG. 3, the panel 28 is folded toward the observer onto panel 26 and panel 24 is then folded onto the folded panel 28. The openings 18 match up to form the viewing window. The glue surface 58 secures panel 24 to the panel 28. A lower portion of panels 24, 26 and 28 when secured together form the handle portion 10 and the upper portion thereof forms a part of the viewing portion 12. A transparency 20 is adapted to be moved downwardly in a slot 64 which is formed between panels 28 and 26 and which is open at the top and bottom for longitudinal movement of such transparency.

To further form the viewer, the upper portion of the blank is folded rearwardly on the fold line 36 and the back side, namely the glue surface 62, of panel 46 is laid on the surface of panel 26 and secured thereto, best shown in FIG. 2. The parts are dimensioned and arranged such that upon locating the bottom end edge of panel 46 with the bottom end edges of panel 24, 26 and 28 as folded, the panels 44, 38, and 34 will form the boxlike viewing portion 12 with the apertures 57 longitudinally aligned with the window 18. The panel 50 is then folded over onto the glue surface of panel 38 for securement thereto. Panel 54 is then folded into the viewing portion, as seen in FIG. 1, to an angled position to hold the boxlike viewing portion in its unfolded position. Before folding the panel 50 over onto the panel 38 and gluing it thereto a magnifying lens 16 is inserted in the area of the apertures 57 between the two panels so that in the glued position of the panels such magnifying lens is held in place. In the formation of the blank 22, it is preferred that a recess or depression 66 be provided peripherally around each of the apertures 57 on the side of the panels which will be adhered together by the glue surface 60 for specific placement of the lens in the apertures 57.

The large panel 50 provides a face surface for printed material thereon, such as advertising material to promote services or products. Such printing may be associated with material presented on transparency 20.

The folding of the viewer as just described may be accomplished at the factory or by the consumer, but in either case if it is to be stored or shipped when once folded, the panel 54 is swung outwardly from within the viewing portion 12 and the boxlike viewing portion collapsed against the back portion of the viewer in either an upward or downward direction to form a flat package.

A second form of the viewer is illustrated in FIGS. 6, 7, 8 and 9. This viewer has a handle portion 70, a viewing portion 72, and an advertising or face portion 74. It is formed from a blank 75, FIG. 8, having selected panels and bend lines to form the structure shown in FIGS. 6 and 7. This blank comprises an elongated strip of material having a uniform width. Starting from the upper end as viewed in the drawings, it has eight panels 76, 78, 80, 82, 84, 86, 88 and 90. Panels 78 and 80 are connected by a fold line 92, panels 80 and 82 are connected by a fold line 94, panels 82 and 84 are connected by a fold line 96, panels 84 and 86 are connected by a fold line 98, and panels 86 and 88 are connected by a fold line 100. Panels 76 and 88 have window portions 102 therein which as will be seen align with each other when the blank is folded. Panel 84 has a circular opening 106 for a lens 73.

Panels 78 and 90 have glue surfaces 108 and 110, respectively, and a narrow glue line 112 is also provided just below the fold line 100. A pair of laterally extending depressions or recesses 114 and 116 are provided in the panel 76, the depression 114 being provided just below the upper end of the panel and the depression 116 being provided adjacent the bottom of said panel.

In folding the blank shown in FIG. 8 the upper end of the blank is folded forwardly and downwardly on all intermediate fold lines, and the panel portion 76, 78 turned in so as to extend upwardly and lie with the back surface thereof on panels 88 and 90, respectively. In this partially folded condition, the two windows 102 are aligned and the upper portion of panel 76 overlies glue line 112 and is secured thereto. The back surface of panel 78 overlies panel 90 and its glue surface 110 and is secured thereto. The panel 80 overlies panel 78 and is secured thereto by glue surface 108 on panel 78. This forms the viewing or box portion 72, namely, the panel 82 forms the bottom of the box, the panel 84 forms the front of the box, and the panel 86 forms the top. The panels 78, 80 and 90, being secured together, form the handle portion 10 which is substantially rigid. The channels 114 and 116 space the panel 76 slightly away from the panel 88 to form a slide-receiving slot 118 for receiving transparencies in lateral movement. A front plate 120 is secured on the face of the viewer, as by an adhesive surface 121 on the plate 120, so that an enlarged advertising surface is available. The face plate 120 has an aperture 122 which is aligned with the aperture 106 in the front panel 84, and the lens 73 is glued in place as in FIG. 1. The embodiment of FIGS. 6—9, similar to the first embodiment, can be folded for shipment or storage, namely, the viewing portion can be collapsed downwardly or upwardly into a flat unit.

FIG. 9 shows a novel construction of lens 123 wherein the lens has a peripheral enlargement 124 provided with a circumferential notch 126 for receiving a portion of the defining walls of the opening 106 and 122. Preferably the diameter of the lens is slightly greater than the diameter of the openings 106 and 122 whereby in the assembly of the viewer, the lens can be snapped in place as a final step.

FIG. 10 shows another embodiment of the invention. This embodiment like the others has a handle portion 128, a viewing portion 130, and an advertising or face portion 132. The blank is not shown in detail but like FIG. 6, it is formed from an elongated strip of material of uniform width. It has five panels 134, 136, 138, 140 and 142. Panels 134 and 136 are connected by a fold line 144, panels 136 and 138 are connected by a fold line 146, panels 138 and 140 are connected by a fold line 148, and panels 140 and 142 are connected by a fold line 150. Panel 142 has a window 152 and panel 138 has an opening 154 for receiving a lens 156. Either the back of panel 134 or a forward lower portion of panel 142 has a glue surface 158 for securing panel 134 to panel 142 with the panels 136, 138 and 140 being folded into a boxlike viewing portion.

Rotatably mounted at the rear surface of panel 142 is a card or plate 160 having a plurality of illustrations, not shown, which are arranged to appear in window 152. Preferably, the card 160 is round and is rotatably mounted on the panel 142 by a pin or shaft 162 which penetrates panels 142 and 134 as well as the card 160. The pin 162 has an enlarged tip 164 which is tapered in forward and rearward directions facilitating snapping different cards 160 on and off the pin. Pin 162 has a head 166 at its other end to hold it in place. Such pin may serve to hold the viewer together in lieu of the glue surface 158 if desired.

In the embodiment of FIG. 10, the means 160 carrying the illustration is rotatable rather than slidable but accomplishes the same purpose. The viewer is foldable to a flat package for mailing or storage. An enlarged front plate, not shown, may be secured to the face of panel 138 as in FIG. 7 for increasing advertising space.

According to the invention, a viewer is provided which is inexpensive to manufacture and which may be disposed of after limited use. The viewer can be shipped in flat condition, either before or after formation from its blank, and has means on the front panel to provide an advertising or promotion surface in combination with the transparencies adapted for viewing by the viewer.

It is to be understood that the forms of my invention herein shown and described are to be taken as preferred examples of the same and that various other changes in the shape, size and arrangement of parts may be resorted to without departing from the spirit of my invention.

Having thus described my invention, I claim:

1. A disposable viewer comprising:
   a. a viewing portion including a boxlike structure having top, bottom, front and back walls,
   b. a handle portion on said viewing portion,
   c. a single lens in said front wall,
   d. a viewing window in said back wall aligned from front to back with said lens,
   e. means defining a laterally extending slot in the back wall of said viewer in the area of said window for movably supporting display material in front of said window for viewing through said lens,
   f. and face panel means secured to said front wall arranged to receive printed matter,
   g. said face panel means being of greater top to bottom length than said front wall to provide an enlarged area relative to said front wall,
   h. said viewer is constructed of a single blank of uniform width material selectively folded on transverse lines to form said handle portion, said viewing portion, and said slot,
   i. said blank of paper has a plurality of panels some of which are hingedly connected together for folding into said handle and viewing portions,
   j. at least two of said panels having overlying relationship,
   k. at least one of said overlying panels having a pair of spaced, laterally extending projections abutting said other overlying panel at points disposed above and below said window to space said panels apart to form said slot means therebetween in said area of the window.

2. The viewer of claim 1 wherein said lens has a peripheral notch and said front wall has an opening of a dimension such that the lens is arranged to be snapped in place with the defining wall of said opening engaged in said notch.